United States Patent [19]

Aoki

[11] 4,341,857

[45] Jul. 27, 1982

[54] PHOTOGRAPH FILM UNIT

[75] Inventor: Nanao Aoki, Ashigara, Japan

[73] Assignee: Fuji Photo Film Co., Ltd., Kanagawa, Japan

[21] Appl. No.: 162,234

[22] Filed: Jun. 23, 1980

[30] Foreign Application Priority Data

Jun. 27, 1979 [JP] Japan .................................. 54-81927

[51] Int. Cl.³ ......................... G03B 17/50; G03C 1/42

[52] U.S. Cl. ..................................... 430/207; 430/208; 430/499

[58] Field of Search ................ 430/207, 208, 496, 499

[56] References Cited

U.S. PATENT DOCUMENTS

| | | | |
|---|---|---|---|
| 3,138,459 | 6/1964 | Land | 430/207 |
| 3,221,942 | 12/1965 | Glass | 430/496 |
| 3,342,600 | 9/1967 | Downey | 430/208 |
| 3,352,674 | 11/1967 | Harvey | 430/207 |
| 3,672,272 | 6/1972 | Cole | 430/207 |

*Primary Examiner*—John E. Kittle

*Assistant Examiner*—John L. Goodrow

*Attorney, Agent, or Firm*—Sughrue, Mion, Zinn, Macpeak & Seas

[57] ABSTRACT

An improvement to instant photograph film wherein spotted uneven concentration is effectively prevented, particularly under high temperature conditions, from being produced in the image zone edge portion during the formation of images after pressure and treatment. A zone of grooves is formed, in the width direction along the cross edge portion, in at least one face of the mutually opposite faces between a first sheet and a second sheet adjacent a treating liquid container. Thus, the thickness of the spread treating liquid is made uniform and increases near the grooves to reduce the floating of the second sheet. The second sheet's floating or rising is suppressed due to the increase in contact area with the viscous treating liquid. Trapped air is caught to prevent it from reaching the image zone portion. Since a partial air layer is prevented from being formed between the first sheet and the second sheet, the spotted uneven concentration does not appear.

4 Claims, 14 Drawing Figures

PHOTOGRAPH FILM UNIT

The present invention relates to a film for instant cameras and more particularly to an improved photographic film unit which is adapted to prevent spotted, uneven concentrations from appearing near the photo image border.

The general type of prior photographic film unit is disclosed in, for example, U.S. Pat. No. 4,042,395 (corresponding to Great Britain Pat. No. 1,507,979 and Japanese Laid Open patent application Publication No. 153,628/1975), Great Britain Pat. No. 1,513,733 (corresponding to Japanese Laid Open patent application Publication No. 153,629/1975), U.S. Pat. No. 4,042,396 (corresponding to Great Britain Pat. No. 1,541,861 and Japanese Laid Open patent application Publication 11,027/1977), U.S. Pat. No. 3,761,269 (corresponding to Great Britain Pat. No. 1,402,104 and Japanese Laid Open patent application Publication No. 43,317/1973). A commercially available example would be Kodak (registered trademark) brand instant color film PR 10 for use with Kodak brand instant cameras. Also, U.S. Pat. No. 3,415,646 (at FIGS. 1 and 2) and U.S. Pat. No. 3,415,644 (at FIGS. 1 and 2) show a film structure for Polaroid (registered trademark) brand instant film, and particularly one way to use a rupturable container to apply a processing composition.

As shown in FIGS. 1 and 2, a representative prior art film unit 8 includes of a first sheet 1, having an image receiving light sensitive inner side 15 and a photo viewing side 16. There is also a light transmitting second sheet 2 having an image receiving outer side 18 and an inner side 17. A mask sheet 3, situated between sheet 1 and 2 has end flaps 19 and 20. A treating (processing) liquid container 4 is stored in pouch 26 made from flap 19, and a liquid storing material 5 is stored in a pouch 27 made from flap 20. Two longitudinal spacers 6 provide separation between sheet 2 and mask 3. After exposure to an image in a camera the film unit self-develops when the treating or processing liquid in container 4 is spread uniformly on inner side 15 of first sheet 1 forming a photo image on photo viewing side 15.

The film unit's mask sheet 3 is sealed to first sheet 1. Second sheet 2 is superposed over sheet 1 in face-to-face relation and sealed on its longitudinal edges to corresponding spacers 6. The spacers 6 are in turn sealed to the back for sheet 2-facing side 28 of mask 3, forming a shallow longitudinal channel to accept the treating liquid to be spread between sheet 1 and sheet 2. The long, bulbous treating liquid container 4 is transversely disposed in pouch 26 at the insertion ends of sheet 1 and sheet 2. Container 4 is designed so that when the film unit is passed through a transverse compression roller mechanism (not shown) in the direction indicated by the arrow in FIG. 1, the roller pressure will burst container 4 along edge 35 leading to the space provided by spacers 6 between sheets 1 and 2 releasing the treating liquid 41. Further progress of film unit 8 through the rollers will spread the treating liquid between sheets 1 and 2 until a residue of liquid is forced into a liquid storing material 5 contained in pouch 27.

When the above self-development treating operation is performed using a transverse roller mechanism inside a camera, it is normally difficult to spread the treating liquid evenly across the entire image area 11 bordered by mask 3 between sheet 1 and sheet 2 and to retain a uniform face-to-face contact of sheets 1 and 2 through the treating liquid; the resulting non-uniformity causes unfavorable irregularities in the developed photograph, particularly in the area corresponding to the transverse image edge 12 at the insertion end where the treating liquid was first forced to enter between sheets 1 and 2.

Thus, in the conventional prior art film unit 8, spotted, uneven image concentrations 13 have often been observed to appear on the image zone edge portion 12, as shown in FIG. 3, after pressing and treatment, deteriorating image quality.

Partial air layers caused when the treating liquid is spread by the rollers between sheet 1 and sheet 2 can be the cause of this uneven concentration. Time-adjusting and neutralizing functions with respect to the treating liquid are performed by a reactive layer applied on inner side 15 of sheet 1 to time and then halt the developing operation. Thus, if any air layer appears, image concentration will be uneven due to differences in timing and halting of the developing process between air layer-containing portions and a normal image zone portion.

Firstly, the partial air layer arises in part because of air forced between sheets 1 and 2 when container 4 is broken under roller pressure. Secondly, increased separation between sheet 1 and sheet 2 across the treating liquid because of a floating of sheet 2 on the spread treating liquid will cause air layer formation.

When a spreading roller mechanism disposed inside a camera using the film unit breaks container 4 and spreads the treating liquid between sheets 1 and 2, air may also be pressed between sheet 1 and sheet 2. A small air layer exists which is formed by the mask sheet 3 and the treating liquid moving ahead of a position where the treating liquid container 4 is compressed by the spreading roller mechanism. This is considered to be responsible for the first air involvement.

Second, flotation of the sheet 2 can cause an air layer, the flotation arising because of flexible movement of sheet 2, such as curling or the like, or an altered condition of the mask sheet covering sheet 1, particularly edge 21 of sheet 2 near where container 4 is broken open. This affects the thickness of the spread treating liquid existing near the cross edge 21. Rises in temperature and humidity, increase the likelihood of such phenomena.

The present invention modifies the film unit construction to effectively prevent spotted uneven concentrations 13 from being caused in the image zone edge portion 12 during the formation of images after roller pressure and spread of the treatment liquid.

According to the present invention, at least one bumpy dam or transverse strip 30, having grooves 22, is formed in the inner side of either sheet 1 or 2, in a zone beginning near the cross edge portion 21 of sheet 2; the zone can range as far as to the image zone edge portion 12 caused by mask 3 on sheet 1. The bumpy strip or dam regulates the flow of the treating liquid, improves its viscosity through an increase in the thickness of the spread treating liquid layer, and traps any air involved.

Accordingly, an object of the present invention is to provide a novel instant photograph film having means to prevent spotted, uneven image concentrations near the image border, particularly when the film is or has been subjected to high temperature or humidity conditions.

Other objects, features, aspects and advantages of the present invention will become more apparent from the following detailed description of certain embodiments when takin in conjunction with the accompanying drawings in which.

Figure 6:
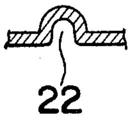
Figure 6:
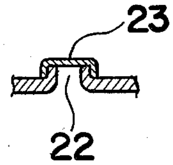
Figure 6:
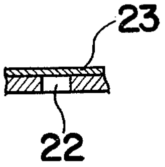
Figure 6:
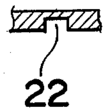
Figure 6:
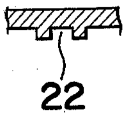
Figure 6:
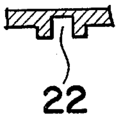
Figure 6:

FIGS. 6(*a*) to 6(*g*) are cross-sectional views of various grooves, each showing a different groove that can be used in the bumpy strip 30 of the invention.

Figure 7:
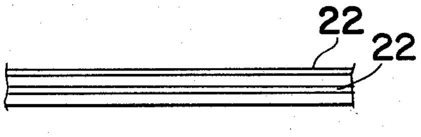
Figure 7:
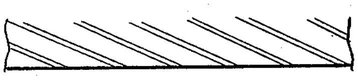

FIGS. 7(*a*) and 7(*b*) are plan views of bumpy strip 30 each showing a different way to arrange grooves 22 with respect to edge 21 of sheet 2.

The present invention will be described for representative embodiments with reference to the accompanying drawings.

Figure 1:
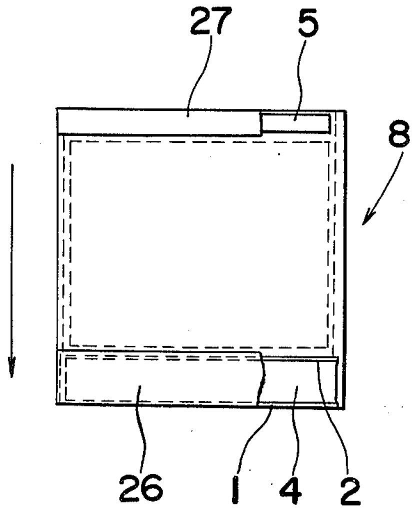
Fig. 1 PRIOR ART
FIG. 1 is prior art, showing a partially cut away view of the image receiving side of an instant photograph film unit.
Figure 3:
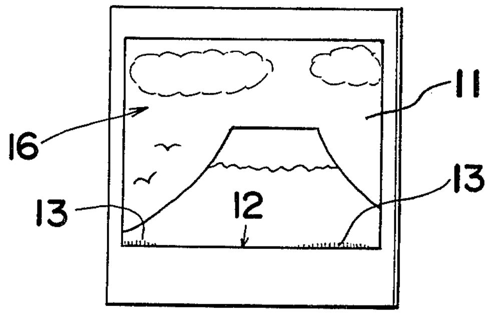
Fig. 3 PRIOR ART
FIG. 3 is prior art, showing the photo viewing side of the film unit of FIG. 1, the developed photo exhibiting spotted, uneven image concentration 13.
Figure 2:
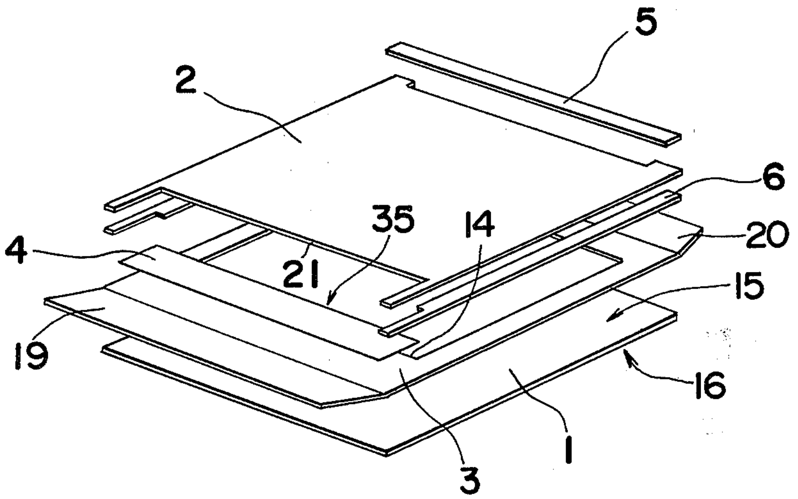
Fig. 2 PRIOR ART
FIG. 2 is prior art, showing an exploded perspective view of the film unit of FIG. 1.
Figure 4:
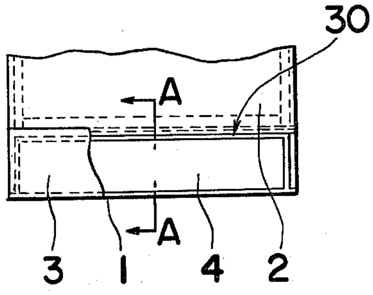
FIG. 4 is a partially cut away of the essential portions of the image receiving side of an instant photograph film unit embodying with the present invention.
Figure 5:
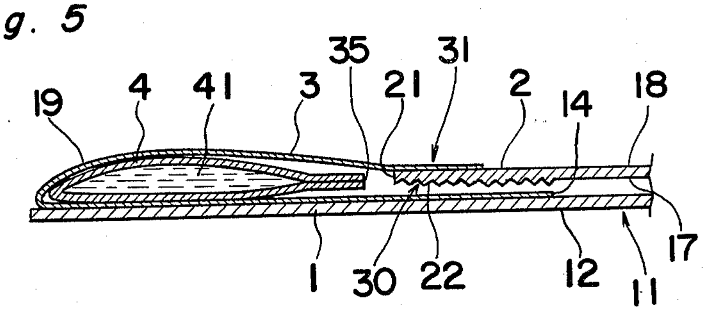
FIG. 5 is an enlarged cross-sectional view of the embodiment of FIG. 4 seen along A—A of FIG. 4.

As shown in FIGS. 4 and 5, the invention is an improvement to an instant photographic film unit of prior art construction having a mask sheet 3 affixed to the inner side 1 of a first light sensitive sheet 1. A treating liquid container is affixed within the turned-up flap portion 19 of the mask sheet 3. A second light transmitting sheet 2 is put over sheet 1, in face-to-face relationship. The turnedup portion 19 of mask sheet 3 is bonded at 31 on the side of the outer side or face 18, near the cross edge portion 21, of sheet 2.

A strip 30, of parallel bumpy grooves 22 is formed in the transverse or width direction beginning near the edge portion 21 on the inner side 17 of sheet 2, the strip can extend as far as the region of transverse edge 14 of mask 3.

Bumpy grooves 22 can be formed through depression of the above-described face by a well-known art such as the grooved stamp art or the like.

Grooves 22 may be chosen to have various bumpy cross sections; A groove 22 may be forced out of a sheet as in FIG. 6(*a*). A punched slot may be sealed with a U-shaped channel seal 23 as in FIG. 6(*b*). A slot may be sealed with a flat seal 23 as in FIG. 6(*c*). A groove may be depressed as in FIG. 6(*d*). A groove may be raised as in FIG. 6(*e*). A depression and raise may be jointly used as in FIG. 6(*f*). Both sides of a V-shape groove may be raised, as shown in FIG. 6(*g*), in the process of making a V-shaped groove with a knife or the like.

To form the bumpy or uneven grooves 22, it is preferable to increase the thickness of the sheet in the region in which they are formed, such as at 30 in sheet 2 in FIG. 5, an additional amount beyond the usual thickness; this increase is preferably at least 25$\mu$ (microns) and more preferably 50$\mu$ to provide a base out of which the grooves can be formed.

Also, the uneven grooves 22 may be not only grooved into, but also knurled (embossed) on the sheet portion.

Furthermore, all the bumpy grooves 22 may be continuously straight or corrugated in shape parallel to edge 21 as shown in FIG. 7(*a*) or inclined to edge 21 as shown in FIG. 7(*b*).

The bumpy grooves 22 may alternatively be formed on the inner side 15 of the first sheet 1 or alternatively on the insides of both sheet 1 and sheet 2.

In a film unit provided with the bumpy grooves 22 therein, the bumpy or uneven grooves 22 serve as a bumpy dam between sheet 2 and screen 3 covering sheet 1 regulating the flow of the treating liquid 41 squeezed from container 4, thereby removing irregular thickness in the treating liquid layer, particularly along the transverse or width direction, near the breaking portion 35 of container 4 adjacent photo border 12. The spread treating liquid is increased in thickness to reduce any relative floating of flexible sheet 2 on the treating liquid. In addition, a space for trapping air in dam 30 is formed with the result that it is made more difficult for air to reach the image zone 11 which begins at photo border 12.

Accordingly, a partial air layer is prevented from being formed between sheet 1 and sheet 2 so that a proper synchronized development and neutralization stop are performed over the entire image zone 11 preventing spotted uneven image concentrations, particularly those which occur more during photographing and treating operations performed at high temperatures or humidities.

As illustrative of the improved effect of the invention experimental results comparing the frequency of spotted uneven concentration occurrence between a conventional prior art Kodak instant color PR10 film unit and the photograph film unit of the present invention were as follows when a series of controlled photographs were taken with both kinds of film units in a Kodak instant camera.

Both products subjected only to normal temperature (23° C.) and products that had been aged at a high temperature (80° C. for one hour) were used for each kind of film unit. All photographing was at normal temperature (23° C.).

One hundred photographs were taken for each product under the same temperature condition. All spotted uneven concentrations caused in the image zone were counted, regardless of the degree of unevenness in the concentration grade.

| | Spotted Photes Per Hundred Shots | |
|---|---|---|
| | Normal Temperature (23° C.) | High-Temperature Aging (80° C.) |
| Prior Art Product | 3 | 28 |
| Invented Product | 0 | 0 |

As the above table shows, the high-temperature aged products of the present invention were completely free from the spotted uneven concentration, while 28% of the prior art high-temperature aged products exhibited spotted uneven concentration.

As is apparent from the above-description, the bumpy grooves are formed, in the transverse or width direction near the cross edge 21 portion of sheet 2, in at least one face of the mutually opposite inner faces of sheets 1 and 2. Thus, the thickness of the spread treating liquid is made more uniform and increases near the bumpy grooves to reduce any floating of sheet 2. Also, the floating or curling of sheet 2 is suppressed due to the increased surface contact area of the viscous treating liquid and the grooved sheet. Air is caught in dam 30 preventing the air from reaching the image zone portion 11, eliminating spotted, uneven concentrations caused by partial air layers.

Also, since the bumpy grooves are formed in at least one of the first sheet and the second sheet, the manufacturing processes for the improvement are simplified and the film unit cost remains almost unchanged.

Although some embodiments of the present invention has been described and illustrated in detail, it is to be clearly understood that the same is by way of limitation, the spirit and scope of the present invention being limited only by the terms of the appended claims.

What is claimed is:

1. A photograph film unit comprising a sensitive first sheet having a picture border surrounding an image area, a second sheet having a leading cross edge portion and being superposed on the first sheet in face-to-face relation, and a processing liquid container being disposed on one end portion of said first sheet and of said second sheet, near the second sheet's cross edge portion, to supply a processing liquid between the first sheet and the second sheet, characterized in that a bumpy strip is formed near and parallel to the leading cross edge portion of the second sheet, on at least one face of the mutually opposite faces between the first sheet and the second sheet, in a zone extending only from the cross edge portion of the second sheet on the side of said treating liquid container to the edge portion of the image area of the first sheet, whereby said bumpy strip forms a dam for catching any air trapped between the sheets when said container is ruptured and the processing liquid is spread through said zone toward said image area, thereby preventing the air from reaching the image area.

2. A photograph film unit of claim 1, characterized in that the bumpy strip is formed on the second sheet.

3. A photograph film unit of claim 1 or 2 characterized in that said one face contains a plurality of grooves substantially parallel to said leading cross edge portion.

4. A photograph film unit of claim 1 or 2 wherein said one face contains a plurality of grooves inclined to said leading cross edge portion.

* * * * *